United States Patent [19]

Morrison, Jr. et al.

[11] Patent Number: 4,474,821
[45] Date of Patent: Oct. 2, 1984

[54] ACCELERATED DECAFFEINATION PROCESS

[75] Inventors: Lowen R. Morrison, Jr., Hamilton; John H. Phillips, Fairfield, both of Ohio

[73] Assignee: The Procter & Gamble Company, Cincinnati, Ohio

[21] Appl. No.: 453,069

[22] Filed: Dec. 27, 1982

[51] Int. Cl.$^3$ ................................................ A23F 5/20
[52] U.S. Cl. ...................................... 426/428; 426/594
[58] Field of Search ........................................ 426/428

[56] References Cited

U.S. PATENT DOCUMENTS

| | | | |
|---|---|---|---|
| 953,643 | 3/1910 | Seisser | 426/428 |
| 1,742,261 | 1/1930 | Klein | 426/428 X |
| 3,671,262 | 6/1972 | Wolfson et al. | 426/428 |
| 3,671,263 | 6/1972 | Patel et al. | 426/428 |
| 4,276,315 | 6/1981 | Katz et al. | 426/428 |

FOREIGN PATENT DOCUMENTS 1054438 5/1979 Canada ................................ 426/428

Primary Examiner—Joseph Golian
Attorney, Agent, or Firm—Nancy S. Mayer; Rose Ann Dabek; Richard C. Witte

[57] ABSTRACT

This invention relates to an improved countercurrent extraction process for accelerated decaffeination of coffee beans, and to the novel decaffeinated coffee product generated thereby. In particular, turbulent flow of the extracting solvent is used to obtain a substantially accelerated decaffeination rate involving a caffeine extraction time of only from about 3 to about 5 hours. Since the rate of extraction of non-caffeine coffee solubles is not correspondingly accelerated, the decrease in extraction time minimizes the loss of these valuable materials. Use of multiple vessels in countercurrent operation also decreases the loss of non-caffeine coffee solubles, resulting in an improved decaffeinated coffee.

20 Claims, 5 Drawing Figures

ACCELERATED DECAFFEINATION PROCESS

BACKGROUND OF THE INVENTION

This invention relates to an improved countercurrent extraction process for accelerated decaffeination of coffee beans, and to the novel decaffeinated coffee product generated thereby. In particular, turbulent flow of the extracting solvent is used to obtain a substantially accelerated decaffeination rate involving a caffeine extraction time of only from about 3 to about 5 hours. Since the rate of extraction of non-caffeine coffee solubles is not correspondingly accelerated, the decrease in extraction time minimizes the loss of these valuable materials. Use of multiple vessels in countercurrent operation also decreases the loss of non-caffeine coffee solubles, resulting in an improved decaffeinated coffee.

A major problem in the commercial manufacture of decaffeinated coffee is the rather lengthy process times involved, resulting in higher costs for decaffeinated coffees than for non-decaffeinated coffee products. Decaffeination of green coffee beans typically involves five basic steps comprising steaming, pre-wetting, caffeine extracting, solvent stripping, and finally drying and cooling. These steps are well known and background information on them can be found in Sivetz, *Coffee Processing Technology*, Avil Publishing Co., Vol. 2, page 207–215 (1963); U.S. Pat. No. 897,840, issued to Meyer et al (1908); U.S. Pat. No. 936,392, issued to Wimmer (1909); U.S. Pat. No. 1,502,222 to Wimmer (1924); U.S. Pat. No. 1,957,358 to Scheele (1934); and U.S. Pat. No. 1,977,416 to Wilder (1934). Traditionally, these typical decaffeination processes could take a total time of about 31 to 43 hours, with about 24 to 36 hours of this total time required for the caffeine-extracting step.

Process improvements in recent years have decreased the caffeine extraction times to about 10 to 16 hours. U.S. Pat. No. 3,671,262 of Wolfson et al (1972) discloses that use of high solvent superficial velocities in combination with high solvent exchange rates reduces the caffeine extraction time to 16 hours. However, use of the increased solvent velocity rates alone and not in combination with increased exchange rates decreases the extraction time only to about 20 hours. U.S. Pat. No. 3,671,263 of Patel et al (1972) discloses that a combination of an increased pre-wetting bean moisture level with high solvent superficial velocities and high solvent exchange rates results in a decaffeination time of from 10 to 15 hours. The increase in prewetting moisture is related to a beneficial increase in flavor.

The process of the present invention differs from the traditional decaffeination process in several aspects. The steaming and prewetting steps are combined into one step. The higher bean pre-wetting moisture level of Patel et al is not employed because valuable coffee solubles are stripped from the beans by the water. The decaffeination rate is accelerated due to use of turbulent flow of the extracting solvent. The prior art processes claiming improved extraction times employed chlorinated hydrocarbon solvents. Chlorinated hydrocarbon solvents are not preferred for the present invention due to recent governmental concerns regarding their safety. Ethyl acetate, a nonchlorinated ester, is preferred as the solvent. Finally, solvent removal from the decaffeinated beans can be by means of the novel technique of differential pressure steam stripping comprising flash evaporation of the solvent during cyclic pressure variations.

The acclerated decaffeination process of the present invention decreases caffeine extraction time to about 3 to about 5 hours, a reduction by at least 50% in extraction time, while providing an improved coffee product through decreased loss of non-caffeine coffee solubles.

Accordingly, it is an object of this invention to provide an accelerated decaffeination process for green coffee beans.

Another object of this invention is to reduce the time required for caffeine extraction from coffee beans to about 3 to 5 hours through use of turbulent flow of the extracting solvent.

It is a further object of this invention to provide a novel, highly aromatic decaffeinated coffee.

These and other objects will become apparent from the following description and examples.

SUMMARY OF THE INVENTION

This invention relates to an accelerated decaffeination process for green coffee beans. More specifically, the invention relates to an improved continuous countercurrent decaffeinating process wherein (1) the steps of steaming and pre-wetting of the coffee beans are combined into one step, (2) solvent turbulent flow is employed in the caffeine-extracting step to accelerate removal of caffeine without accelerating the extraction of non-caffeine coffee solubles, (3) removal of residual solvent is preferably by differential pressure steam stripping, and (4) an improved decaffeinated coffee is produced due to the decrease in loss of the non-caffeine coffee solubles.

In particular, the process comprises:

(a) Adding steam and water simultaneously to green coffee beans for from about 15 minutes to about 45 minutes at atmospheric pressure to raise the bean moisture content to about 20% to about 40%;

(b) Extracting caffeine from the wet green coffee beans by countercurrently passing solvent through the beans in a turbulent flow having a Reynolds Number greater than 250, at a pounds solvent to pounds of bone dry green beans processed ratio of from about 1.5 to about 6 with a minimum solvent recycle ratio of about 5, at a temperature of from about 180° F. (82° C.) to about 220° F. (104° C.) and a pressure of from about 45 psig to about 100 psig, said beans contained in a series of extraction vessels in order of increasing bean caffeine content; and (c) Removing the residual decaffeination solvent from the beans.

After roasting, the improved decaffeinated coffee has increased brew solids, lower pH, and higher acidity when compared to coffee decaffeinated with the same solvent by conventional means.

Figure 1:
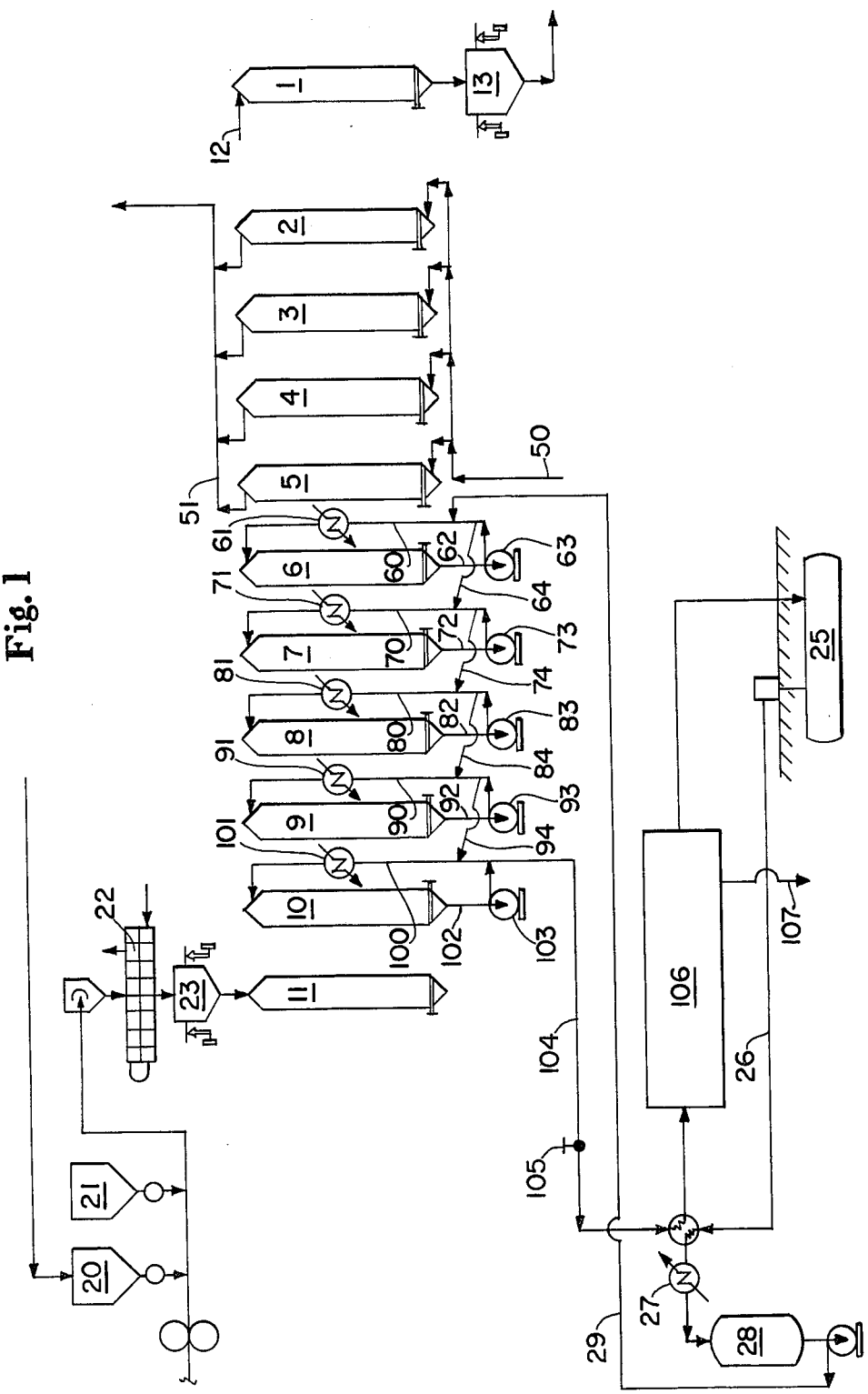
FIG. 1 represents a flow chart showing one method for practicing the process of this invention.

The process is depicted at steady state operation. The coffee beans were introduced into the process in ascending order according to vessel number. Vessels 10, 9, 8, 7 and 6 contain coffee beans undergoing decaffeination. Vessel 6 contains coffee beans having the least amount of caffeine, vessel 7 contains coffee beans having slightly more caffeine, etc., and vessel 10 has coffee beans that have the highest level of caffeine. The decaffeination vessels are connected in series so that solvent may continuously flow through each vessel countercurrent with respect to the decaffeination level of the coffee beans. Vessels 5, 4, 3 and 2 contain decaffeinated coffee beans undergoing solvent removal. Vessel 5 contains coffee beans having the highest level of residual solvent, vessel 4 contains coffee beans having slightly less residual solvent, etc., and vessel 2 contains coffee beans having the least amount of residual solvent. Vessel 1 contains decaffeinated desolventized coffee beans that are being removed from the system. Vessel 11 receives undecaffeinated beans from lorry 23, which have been previously prewet in mixer 22 and blended from bins 20 and 21, for introduction into the decaffeination process.

At steady state operation, vessels of prewetted unextracted coffee beans are periodically added to the system, and vessels of decaffeinated desolventized beans are periodically isolated and removed from the system. Thus, the function of each vessel advances by one position at a constant rate. Each unit operation, i.e. vessel filling, bean decaffeination, solvent removal, and bean discharge from vessel, is carried out in each of the eleven vessels. FIG. 1 depicts only one cycle. During the cycle following that depicted, vessels 11, 10, 9, 8 and 7 will contain beans undergoing decaffeination. Vessels 6, 5, 4 and 3 will contain decaffeinated coffee beans undergoing solvent removal. Vessel 2 will have been removed from the system and will be ready for bean discharge. Vessel 1 will receive prewetted undecaffeinated beans from lorry 23 for introduction into the decaffeination system.

For the cycle shown in FIG. 1, fresh solvent enters the system through vessel 6 and proceeds through vessels 7, 8, 9, and finally 10. Fresh solvent from tank 25 is pumped through line 26, through heat exchanger 27 wherein it is heated to about 180° F. (82° C.), and to solvent saturator 28. After saturation with water the solvent is then pumped through line 29, combined with recycle solvent from line 60, pumped through heat exchanger 61, wherein it is heated to about 200° F. (93° C.), and is introduced into the top of vessel 6 containing the most decaffeinated coffee beans. It passes downward through the coffee beans in vessel 6. The solvent then discharges into line 62, through pump 63, and back into line 60. A major portion of the solvent passes through line 60, through heat exchanger 61 wherein it is heated to about 200° F. (93° C.), and is recirculated into the top of vessel 6. The remainder of the solvent passes through line 60, enters line 64, to line 70. Here it combines with the recycle solvent from vessel 7, passes through heat exchanger 71, wherein it is heated to about 200° F. (93° C.), and is introduced into the top of vessel 7. It passes downward through vessel 7, discharges into line 72, through pump 73 and back into line 70. A major portion of the solvent passes through line 70, through heat exchanger 71, and is recirculated to the top of vessel 7. The remainder of the solvent passes through line 70, through line 74, to line 80, and combines with the recycle solvent from vessel 8. In similar fashion the solvent passes through each vessel in the series. After passing through the final vessel in the series the portion of the solvent not recirculated passes through line 104 and discharge control valve 105 to the solvent recovery system 106. Caffeine is separated from the solvent in the solvent recovery system and exits through line 107.

After completion of the decaffeination step the coffee beans are ready for removal of residual solvent. Each vessel is sequentially placed in the solvent removal series as it is removed from the decaffeination series. Only the preferred method of solvent removal will be described. A low pressure is first applied to vessel 5 to flash evaporate residual solvent. Steam is introduced into vessel 5 through line 50 and a valve at the top of vessel 5 is closed. The steam flow causes the column to pressurize annd the steam condenses on and within the coffee beans. The steam flow is stopped and the pressure maintained. The valve is then opened and the low pressure is again applied. Steam is introduced through line 50 to remove remaining evaporated solvent through line 51. Line 51 is connected to a vacuum source. The foregoing cycle is repeated at intervals of about 10 to about 20 minutes until the residual solvent concentration drops to the desired level. Steam flow is preferably intermittent. It is stopped for a part of the higher pressure portion of the cycle and for a part of the lower pressure portion of the cycle. The steam flow is at a lower rate during the remainder of the lower pressure portion of the cycle, and is increased to initiate the higher pressure portion of the cycle. Vessels 4, 3 and 2 are treated in the same manner.

After completion of the solvent removal step the coffee beans are removed from the vessels by gravity flow, air or nitrogen sparging, or a combination of these. Air or nitrogen enters to top of vessel 1 through line 12. The coffee beans are discharged into lorry 13 for subsequent processing.

Figure 2:
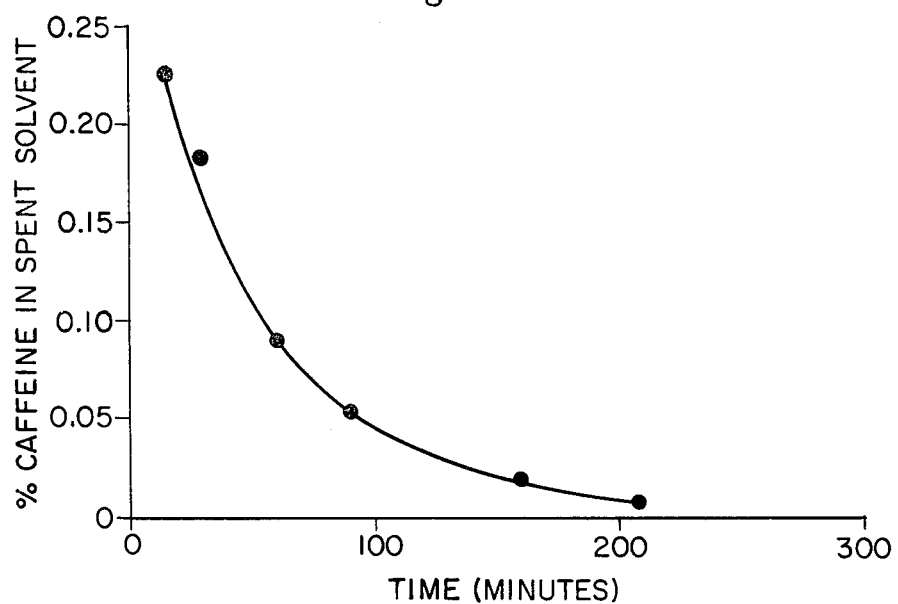

FIG. 2 represents the variation of the caffeine content in the spent solvent with decaffeination time for a single vessel process. It illustrates that the largest portion of the caffeine is removed from the coffee beans by the solvent at the beginning of the decaffeination step of the process, with decreasing amounts of caffeine removed throughout the remainder of the process. The level of caffeine approaches zero with increasing time.

Figure 3:
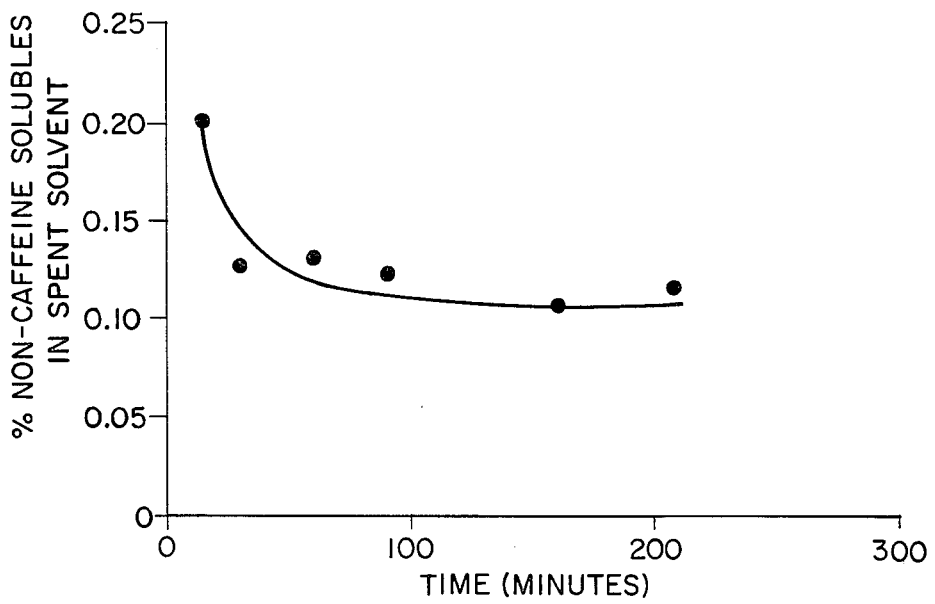

FIG. 3 represents the variation of the non-caffeine coffee solubles content of the spent solvent with decaffeination time for a single vessel process. It illustrates that the amount of non-caffeine solubles removed does not approach zero with time but instead reaches a constant level. Therefore, a decrease in the total decaffeination time decreases the total amount of coffee solubles extracted. Acceleration of decaffeination increases the rate of caffeine removal without making a corresponding increase in the rate of removal of coffee solubles.

Figure 4:
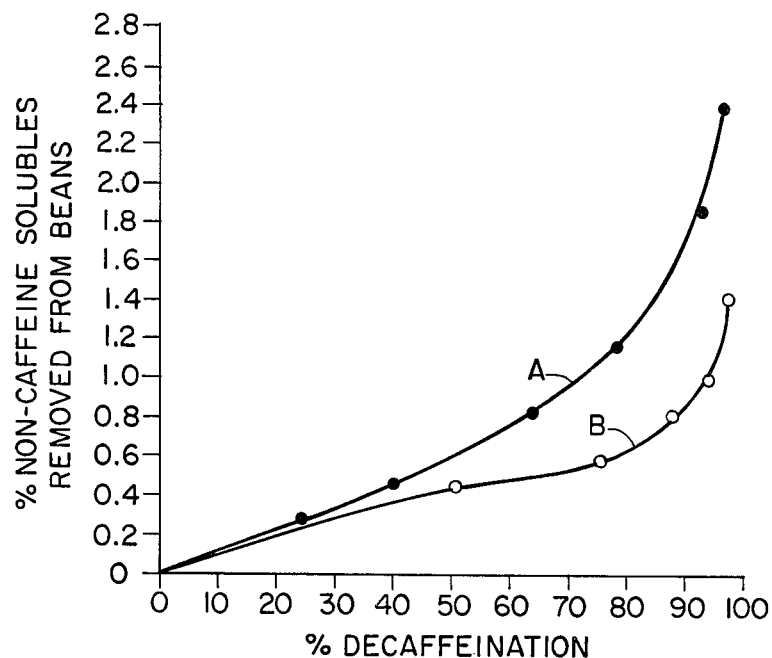

FIG. 4 represents the increase in the total non-caffeine coffee solubles removed from the beans with percent decaffeination for a single column process denoted by line A, and a multi-column countercurrent continuous process denoted by line B. At equal levels of decaffeination, the amount of non-caffeine coffee solubles removed is less for the multi-column countercurrent process.

Figure 5:
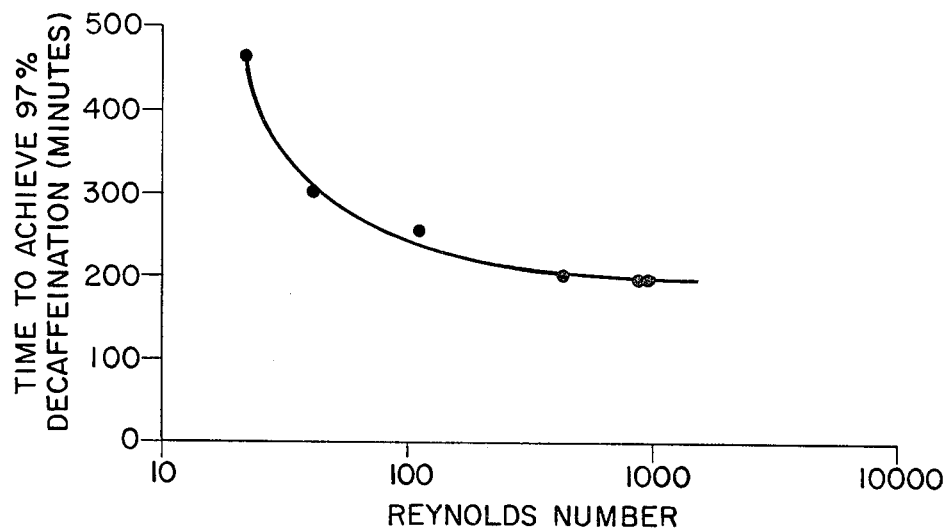

FIG. 5 represents the effect of Reynolds' Number on the time required to achieve 97% decaffeination of green coffee beans. As the flow rate increases, the Reynolds' Number increases and the time required to reach 97% decaffeination of the coffee beans is decreased.

DESCRIPTION OF PREFERRED EMBODIMENTS

Predecaffeination Moisture Addition

The steps of steaming and wetting the green coffee beans prior to decaffeination are combined into one step requiring only approximately 20 to 40 minutes. For a single vessel system, the bean moisture content is increased to about 35% to about 55%, preferably about 45% to about 55%. For countercurrent operation of a multi-vessel system, the beam moisture content is increased to about 20% to 40%, preferably 25% to 35%. Water in excess of this range must be avoided in countercurrent operation. A moisture content of about 25% to 35% permits the coffee beans to absorb solvent in the decaffeination step without any moisture being released from the beam in the form of free water droplets. It has been found that if the beans are premoistened to a level of above 40%, free water droplets are formed when solvent is introduced, and water droplets formed in each vessel are introduced into subsequent vessels in the system. Excess water in the decaffeination system will cause water stripping of solubles in the coffee beans with a corresponding decrease in the brew solids yield and flavor loss. If the beams are premoistened to a level of less than about 20%, the bean swell is incomplete during the moisture addition step and the benefits of the accelerated decaffeination step are not obtained. Subsequent swelling during decaffeination can also cause column plugging since the beans are not necessarily fluidized during the decaffeination step.

In the preferred mode green coffee beans are charged into a mechanical mixer. Steam is initially introduced into the mixer containing the agitating beams for about 5 minutes such that sufficient steam condensation occurs to elevate the temperature of the beams to about 212° F. (100° C.). The steam initiates bean swell, rendering the beans more porous for rapid absorption of the liquid water upon its inlet. The steam must be saturated or supersaturated at the operating pressure to prevent drying of the beans due to the heat and pressure conditions. Water is then introduced into the mixer at about 0.2 to about 0.6 lbs. water/hr./lbs. beans. The water addition is continued for only about 15 to 20 minutes. During the final 5 to 10 minutes of the moisture addition step only steam, not water, continues into the mixer. Total time required is about 30 minutes. The time, steam rate, and water flow will be dependent upon the amount of coffee beans used.

Alternately, the predecaffeination moisture addition can be carried out in an extraction or decaffeination column. Green coffee beans are charged into the top of the extraction column by means of a hopper. Steam is introduced to the column through a bottom inlet at a rate in lb./hr./lb. beans of approximately 50 to 200 for about 2 minutes to increase the temperature of the beans to prevent excessive condensation during fluidization. The steam rate and pressure is then increased to fluidize the bed of beans. A steam rate of about 300 lb./hr. is used to fluidize a bean bed of about 120 lbs in a column 8 inches in diameter. The fluidization step is needed to insure that the beans swell up the column instead of swelling into themselves, plugging the column. A pressure differential across the bed of about 45–50 psi is needed to raise the bed. At the above steam rate and pressure, about 2 minutes is required to obtain this differential. Water is introduced into the top of the column at about 0.5 to about 1.0 lbs. water/hr./lbs. beans with continuation of steam through the bottom inlet at the initial lower rate. Water addition is continued for about 15 to 20 minutes. During the final 20 to 25 minutes only steam, not water, continues into the column through the bottom inlet at the initial lower rate.

The height of the coffee beans in the column can be used as an indication of the endpoint of the moisture addition step. The coffee beans swell up the column as a function of the resultant moisture. Therefore, when the final bean moisture is within the desired range, the height of the column of coffee beans is increased by approximately 30%. Using the extraction column a lower fraction of the water can enter as liquid instead of steam and the total time required is about 40 minutes.

Countercurrent Accelerated Decaffeination

In the decaffeination step ethyl acetate is preferred as the extracting solvent and will be used to illustrate the invention. It is essential that the flow of solvent through the coffee beans be at a rate sufficiently high to be turbulent in order to obtain accelerated decaffeination. Use of vessels with a high length-to-diameter ratio and large solvent recycle rates are also important to obtain accelerated decaffeination.

The accelerated decaffeination process can be used on a single class of coffee beans or on a blend of different classes of coffee beans. A blend of Arabica and robusta coffee beans is decaffeinated faster in this process than either Arabica or robusta coffees processed alone.

Fresh solvent from the solvent tank is passed through a heat exchanger, wherein it is heated to a temperature of about 160 F. (71° C.) to 220° F. (104° C.), preferably about 180° F. (82° C.). The solvent is then injected into a solvent saturator containing water. Accurate moisture control is essential. The presence of any excess free liquid water during decaffeination causes water extraction of flavor materials from the coffee beans. The solubility of water in ethyl acetate increases with temperature. Thus, the solvent saturated at 180° F. (82° C.) is slightly less than saturated at the preferred decaffeination operating temperature of 200° F. (93° C.). This permits the solvent to absorb any excess moisture in the system. If the ethyl acetate is used alone and is not saturated with water, the solvent dries the beans and thereby slows the decaffeination rate. The ethyl acetate, after saturation at 180° F. (82° C.), is charged to a series of decaffeination vessels, such as columns, containing the prewetted green coffee beans.

The solvent passes countercurrently through the series of extraction columns, i.e., fresh solvent is continuously introduced to the column containing the most decaffeinated coffee beans, is circulated through beans having increasing amounts of caffeine, and is withdrawn from the system after passing through the column containing beans with the highest caffeine content. The saturated fresh solvent is pumped through a heat exchanger to assure it is heated to the required operating temperature, and is then introduced into the top of the first column of the series containing coffee beans having the least amount of caffeine. The solvent passes downward through the coffee beans, after which a major portion is recycled to the top of the column, and the remainder enters the recycle line of the next column in the series. For each subsequent column the recycle solvent passes through a heat exchanger to maintain a constant temperature throughout the system. The solvent passes downward through the second column of the series. A major portion of the solvent is recirculated to the top of the second column, and the remainder enters the recycle line of the third column in the series. In similar fashion the solvent is passed through the remaining columns in the series, each containing green coffee beans having increasing amounts of caffeine. After passing through the last column of the series containing the least extracted beans, a portion of the solvent is pumped to a solvent recovery system for separation of caffeine from the solvent, and the remaining portion is pumped through a heat exchanger and is recirculated to the recycle line of the final column. At a steady state of operation columns of prewetted unextracted coffee beans are continually added to the series, and columns of decaffeinated beans are continually isolated and removed from the series. Thus, the function of each column advances by one position in the series at a constant rate.

It is believed that caffeine removal from green coffee beans can be modeled as a first order mass transfer process. The rate of decaffeination is equal to an overall mass transfer coefficient multiplied by the intantaneous caffeine driving force from bean to solvent. The process follows the following operating equation:

$$-dC_B/dT = K(C_B - C_S)$$

wherein $dC_B/dT$ is the caffeine removal rate, $C_B$ is the caffeine content in the coffee beans, $C_S$ is the caffeine content in the solvent, and K is the overall mass transfer coefficient. Bean moisture content, temperature, pressure, solvent exchange rate, solvent velocity and type of flow, and solvent recycle, all have an effect on the value of K. The caffeine content of the beans decreases with time. The caffeine content of the solvent also decreases with time since most of the caffeine is removed during the initial period of the process as shown by FIG. 2. A graph of the natural log of the spent solvent caffeine content versus time is linear with a usual correlation coefficient of about 0.99. The slope of this graph is equivalent to the overall mass transfer coefficient K. This model indicates that the decaffeination rate can be increased by increasing the value of the mass transfer coefficient and/or the caffeine bean-to-solvent driving force.

The removal of noncaffeine coffee solubles from the beans does not follow first order mass transfer. FIG. 3 shows that the amount of non-caffeine solubles in the spent solvent does not approach zero with increasing time as does the value of the amount of caffeine in the spent solvent. Instead it reaches a constant level for a single column system. The accelerated decaffeination process increases the rate of caffeine removal without making a corresponding increase in the rate of removal of non-caffeine solubles. The decrease in extraction time decreases their loss, resulting in an improved coffee product. FIG. 4 shows that for a multiple column system the amount of non-caffeine solubles removed from the beans is less than for a single column system. Therefore an even greater decrease in the loss of non-caffeine coffee solubles is achieved using a multiple column countercurrent process for accelerated decaffeination.

In accordance with the above theory, the effect of several operating parameters in accelerating decaffeination will now be individually considered.

Control of coffee bean moisture content is crucial in obtaining an acceleration of decaffeination. The moisture content of the coffee beans is increased prior to the decaffeination step because it increases the caffeine diffusion rate in the bean. The caffeine dissolves in the water within the bean and diffuses into the solvent through this water instead of through the cellular bean material. However, as previously discussed, the beans must be able to absorb solvent without eliminating moisture from the bean in the form of free water droplets. Free water in the system will cause water stripping of coffee solubles.

Increasing temperature increases the decaffeination rate by increasing the mass transfer coefficient. For prewet beans, an increase in temperature results in an increase in the solvent/water distribution coefficient of caffeine. An increase in temperature also increases the caffeine diffusion rate within the coffee beans. Thus, increasing temperature increases the mass transfer coefficient due to an increase in both the caffeine diffusion rate within the beans, and the solvent/water distribution coefficient of caffeine at the bean surface resulting in an accelerated decaffeination rate. However, accelerating decaffeination by increasing temperature is limited when using ethyl acetate as the extracting solvent by the fact that water and ethyl acetate form an azeotrope boiling at atmospheric pressure of 159° F. (71° C.). If the solvent boils in the bean bed, pockets of solvent and water vapor are formed. These pockets slow the decaffeination rate because caffeine removal cannot occur across a solid to vapor interface. Therefore, in order to increase temperature to accelerate decaffeination, pressure in the extraction columns must be sufficiently high to prevent solvent boiling. A temperature range of 180° F. (82° C.) to 220° F. (104° C.) can be employed in the decaffeination step, with a temperature of about 200° F. (93° C.) preferred provided the column is pressurized. The column pressure must be maintained such that it is greater than the sum of the solvent vapor pressure at the operating temperature, and the pressure drop across the bean bed. Column pressures in the range of about 45 psig to about 100 psig are suitable when operating at about 200° F. (93° C.).

Decaffeination is accelerated by increasing the rate of solvent addition into the system. The solvent exchange rate as used herein is a measure of the amount of solvent exposed to a given amount of beans in a specific time. The solvent exchange rate is controlled by the amount of solvent input into the series of extraction columns and the rate of spent solvent withdrawal. Increasing the ratio of pounds of solvent to pounds of bone dry beans processed increases the decaffeination rate by decreasing the concentration of caffeine in the solvent. This is due to a decrease in the time required to change over the spent solvent in a column. The pounds solvent to pounds of bone dry beans processed ratio used is within the range of about 1.5 to about 6, preferably about 2 to about 5.

Control of solvent comprising a mixture of ethyl acetate and water, velocity is also used to influence the rate of decaffeination. The solvent superficial velocity as used herein is defined as:

$$\frac{\text{column flow rate (ft.}^3\text{/min.)}}{\text{column cross sectional area (ft}^2\text{)}}$$

This fraction reduces to feet of solvent/minute and is a measure of the velocity of the solvent past the coffee beans contained in each decaffeination extraction column. Increasing the column superficial velocity increases the decaffeination rate by increasing the mass transfer coefficient. Solvent superficial velocities of from about 2 to about 10 ft./min., preferably from about 6 to about 8 ft./min., are appropriate for use in this accelerated decaffeination process. As the velocity increases, the hindrance to caffeine transfer caused by the bean-to-solvent boundary layer decreases. To maximize the benefit from velocity, the flow through the bean bed should be fully turbulent. This destroys the bean-to-solvent boundary layer, and thus the boundary layer's hindrance to caffeine transfer.

Whether a flow is laminar or turbulent is denoted by the Reynolds number, $R_E$. For packed beds, $R_E$ is calculated as follows:

$$R_E = D_P G/\mu$$

wherein $D_P$ is the particle diameter in feet when a spherical diameter is assumed for the bean, G is the solvent superficial velocity based on an empty cross sectional area of the column in lb./sec. ft.$^2$ and $\mu$ is the solvent viscosity in lb./ft. sec. Generally, for $R_E$ values less than 10 the flow is laminar, between 10 and 100 is the transition zone, and above 100 the flow begins to be turbulent. FIG. 5 shows directly the effect of $R_E$ on the required time to reach 97% decaffeination. These data agree well with theory. The flatter area of the curve, above $R_E$ of about 250, is where full turbulence has been achieved. For the process of the present invention a minimum $R_E$ of 250 is required. Preferably, $R_E$ is at least about 500 to assure the presence of full turbulence. The prior art processes claiming improved extraction times disclosed solvent superficial velocities of from 0.15 to about 1.0 ft./min., preferably from about 0.18 to about 0.25 ft./min. (See U.S. Pat. Nos. 3,671,262 to Wolfson et al (1972) and 3,671,263 to Patel et al (1972).) This corresponds to a Reynolds number of from about 20 to 135, preferably from about 26 to about 36, which is primarily in the transition zone between laminar flow and the beginning of turbulent flow. In contrast, Reynolds numbers greater than 800 are illustrated by Examples 2 and 4 for the process of the present invention.

Adjusting the solvent recycle ratio controls the solvent superficial velocity. The solvent recycle ratio is defined as:

$$\frac{\text{recycle rate (lb./hr.)} - \text{fresh solvent feed rate (lb./hr.)}}{\text{fresh solvent feed rate (lb./hr.)}}$$

This recycle of solvent is also essential for bean decaffeination uniformity. The higher the ratio, the closer each individual column approximates a perfect back mix vessel. Too low of a recycle ratio will yield over decaffeinated beans at the top of the column, and under decaffeinated beans at the bottom. The recycle ratio should be from about 5 to about 20 to maintain decaffeination uniformity. Preferably, the recycle ratio is above a minimum of 5.

The number of columns in the decaffeination series can vary from about 4 to about 15, preferably from about 4 to 6. Use of a greater number of columns decreases cycle time. Cycle time refers to the time interval between addition of columns of undecaffeinated coffee beans to the series. Each column of the series must have a high length-to-diameter ratio, preferably a minimum of 5. The small diameter of the column with respect to its height increases the internal flow rate to aid in achieving turbulence. Since velocity is a function of column diameter, the amount of solvent needed to achieve a desired velocity can be decreased by a factor equivalent to the ratio of column height-to-column diameter. The recycle of solvent and the use of multiple columns also help minimize the solvent needed.

The total decaffeination extraction time when using this accelerated process is usually about 3 to about 5 hours. This represents a reduction by at least 50% in decaffeination time when compared to prior art processes times of about 10 to 15 hours. The total process time for the accelerated process including predecaffeination moisture addition, decaffeination extraction, and solvent removal is from about 7 to about 10 hours.

Solvent Recovery

The solvent containing caffeine removed from the last column of the series can be introduced to an evaporator. Here the spent solvent is distilled to recover fresh solvent. The concentrated spent solvent containing the caffeine can then be further processed to recover the caffeine and remaining solvent.

Solvent Removal

Removal of the solvent residue from the decaffeinated green coffee beans can be by means of conventional steam stripping, countercurrent steam stripping, or differential pressure steam stripping. The preferred method is differential pressure steam stripping.

Conventional steam stripping is usually carried out by introducing steam into the bottom of the column containing decaffeinated coffee beans, passing it through the bean bed, and removing the spent steam from the column above the bean bed level. The pressure maintained is constant. Increasing steam flow rate increases the rate of desolventization through increased velocity and solvent driving force from bean to steam. Conventional steam stripping requires several hours to remove the solvent residue and has high total steam requirements of approximately 7.1 lb. steam per lb. bean when the solvent is ethyl acetate.

Steam stripping may also be carried out countercurrently in the decaffeination column series by introducing steam into the column containing decaffeinated coffee beans nearly completely free of solvent, passing the steam through this column and the others in the series containing beans of increasing residual solvent content, and withdrawing the steam from the last column of the series containing unstripped coffee beans. The solvent content of the steam increases as it passes through the multiple columns, and no portion of the steam is recirculated. A method of increasing pressure may be required between each column in the series. This can be accomplished by means of mechanical compression such as through the use of blowers or pumps, or by means of thermal compression such as through the use of steam ejectors. Total steam requirements are less than for conventional steam stripping. Countercurrent series flow reduces steam usage while maintaining the high driving forces necessary to cause the solvent to diffuse from the interior of the green coffee beans.

Differential pressure steam stripping is carried out by means of flash evaporation of the solvent from the decaffeinated coffee beans through an alternating cycle of pressure variations. Steam is continuously or intermittently passed through the beans contained in one or more vessels. A reduced pressure is first applied to the hot beans which reduces the solvent boiling point and causes the solvent to quickly evaporate from the coffee beans via a mechanism similar to the operation of a flash evaporator. This is continued until the temperature within the bean falls to near the azeotropic boiling point of the solvent-water mixture. The solvent is more volatile than water and is preferentially flash evaporated. Steam is employed to remove the evaporated solvent. The column is then isolated from the low pressure source by closing a valve. The steam flow then increases the column pressure and the steam condenses on and within the cooler beans. The beam temperature and moisture level are increased until temperature equilibrium is reached at the higher pressure. At this point the total liquid content of the beans is approximately the same as when the initial reduced pressure was applied, but a greater proportion of the liquid content is water from the condensed steam because of the preferential flashing of the solvent. The valve is then opened, the low pressure is again applied, and the foregoing cycle is repeated until the residual solvent concentration drops to the desired level.

The transfer from a lower to a higher pressure is accomplished by temporarily isolating the column from the low pressure source. The low and high pressures can be both below atmospheric pressure or both above atmospheric pressure. Either one, but not both, can be at atmospheric pressure. Also, the low pressure can be below atmospheric pressure and the high one at or above atmospheric pressure. The preferred pressure variation is from about 1 to about 5 psia to about 10 to about 20 psia in cycles of about 10 to 20 minutes. The coffee beans may be contained in a stationary bed in a decaffeination column or in an agitating or fluidized bed in a mechanical mixer. Steam flow may be continuous, or stopped during the entire low pressure portion of the cycle, or stopped during only a part of the low pressure portion of the cycle, or preferably stopped during parts of both the low and high pressure portions of the cycle. This latter type of intermittent flow is preferred. The steam flow can be at a constant rate throughout the cycle, or is preferably at a different rate in the high pressure portion than in the low pressure portion of the cycle.

Use of the differential pressure method decreases steam requirements compared to conventional steam stripping. When ethyl acetate is used as the solvent, only about 1.0 to about 4.5 lbs. steam/lbs. beans is required compared to about 7.1 lbs. steam/lbs. beans for conventional steam stripping. The time required for this step is about 3 to 5 hours. This compares with about 7 to about 9 hours for conventional steam stripping of a stationary bed of coffee beans.

Drying and Cooling

Subsequent to the removal of residual solvent from the coffee beans, partial drying of the beans in the columns is accomplished by applying a vacuum of about 1 psia to about 3 psia to the column while still hot to flash evaporate the water. A typical moisture drop for this procedure is about 4% to 5%. Further drying can be accomplished by introducing dry superheated steam into the column. Removal of surface moisture from the beans in this manner simplifies discharge of the coffee beans from the columns.

The coffee beans are removed from the individual columns by gravity flow, air or nitrogen sparging, or a combination of these. A discharge pressure of about 50 to 100 psi of air or nitrogen introduced into the column of about 8 inches in diameter is sufficient to carry the beans out of the bottom of the column and into a blow hopper. For larger columns gravitational forces may be sufficient.

The coffee beans are then dried by means of a standard conveyor dryer, vacuum tumble dryer or a fluidized bed dryer. Conveyor drying is preferred and is carried out by conventional means at a temperature of about 225° F. (107° C.) to about 300° F. (149° C.) for a period of about 15 to about 40 minutes. Vacuum drying is carried out using a jacketed vacuum dryer at a temperature of about 160° F. (71° C.) to about 250° F. (121° C.) at a vacuum of about 5 psia for approximately 8 to 16 hours. Fluidized bed drying is carried out using a fluidized bed dryer at a temperature of about 270° F. (132° C.) to 400° F. (204° C.) for approximately 5 to 15 minutes.

After drying, the beans are cooled by convection methods. The decaffeinated beans are then ready for subsequent roasting and processing into a decaffeinated coffee product.

Decaffeinated Coffee

The decaffeinated coffee generated by the above-described process represents a novel product because the rate of extraction of the noncaffeine coffee solubles is not correspondingly accelerated with the rate of caffeine extraction. Therefore, the decrease in extraction time decreases the loss of the noncaffeine coffee solubles. Multi-column countercurrent operation of the process also contributes to retention of noncaffeine coffee solubles. This is illustrated by higher levels of brew solids and acid components than is obtained in conventionally decaffeinated coffee using the same solvent.

The following Examples illustrate the process and product of this invention. Unless otherwise stated, all percentages are given on a weight basis.

EXAMPLE 1

Example 1 illustrates predecaffeination moisture addition combining the previously separate steps of pre-steaming and pre-wetting the green coffee beans.

One hundred twenty pounds of green coffee beans were charged into a mechanical mixer. Saturated wet stream was introduced into the mixer at a rate of 120 lb./hr. for 5 minutes while the coffee beans were mechanically agitated. Water was then introduced for 15 to 20 minutes while the steam flow continued. The rate of mixing as revolutions per minute and water flow in lbs. water/hr./lbs. beans are listed in Table I-A. During the final 5 to 10 minutes the water flow was stopped and only the wet steam flow continued into the mixer.

Table I-A lists the operating conditions and data obtained for representative runs. Moisture levels attained in the coffee beans are comparable to those using the conventional two-step process. In general, the coffee beans swelled to about 60–70% of their original volume. Use of the mixer requires less time for predecaffeination moisture addition than use of a fixed bed of coffee beans. About 42% of the moisture can enter the mixer as liquid water, compared to about 16% for a fixed bed in a column. Use of the mixer is faster and more energy efficient and is therefore the preferred mode.

TABLE I-A

| | Predecaffeination Moisture Addition in Mixer | | | | | | | |
|---|---|---|---|---|---|---|---|---|
| | Wt. Beans (lbs.) | Time (min.) | Rotation Rate (Rev./min.) | Water Inlet Rate (lbs $H_2O$/hr/ lbs. beans) | Total Liquid Water (lbs.) | Steam Inlet (lb./hr.) | Total Steam (lbs.) | Liquid $H_2O$ Total $H_2O$ % | Bean Moisture (%) |
| (1) | 120 | 30 | 50 | 0.53 | 18.9 | 115.0 | 57.5 | 25.3 | 37.3 |
| (6) | 120 | 20 | 100 | 1.47 | 42.8 | 120.0 | 40.0 | 51.7 | 41.0 |

TABLE I-A-continued

| | Predecaffeination Moisture Addition in Mixer | | | | | | | |
|---|---|---|---|---|---|---|---|---|
| | Wt. Beans (lbs.) | Time (min.) | Rotation Rate (Rev./min.) | Water Inlet Rate (lbs H₂O/hr/ lbs. beans) | Total Liquid Water (lbs.) | Steam Inlet (lb./hr.) | Total Steam (lbs.) | Liquid H₂O Total H₂O % | Bean Moisture (%) |
| (7) | 120 | 30 | 75 | 1.00 | 37.5 | 120.0 | 60.0 | 38.5 | 43.4 |
| (8) | 120 | 30 | 75 | 1.00 | 37.5 | 120.0 | 60.0 | 38.5 | 40.8 |

One hundred twenty pounds of green coffee beans were charged into the top of an extraction column by means of a hopper. Saturated wet steam was introduced to the column through a bottom inlet at the rate of 120 lb./hr. for 2 minutes. Saturated wet steam was then introduced from a side inlet near the column bottom. The steam rate was increased to about 300 lb./hr. at a pressure of 140–145 psi for 3 minutes to fluidize the bed of coffee beans. This created a pressure differential across the bed of about 45–50 psi to raise the level of the bed in the column. The flow of steam entering the side inlet was stopped, and that entering the bottom was reduced to 120 lb./hr. Water was introduced into the top of the column at 0.45 lbs. water/hr./lbs. beans for 18 minutes. The water flow was then stopped. The steam flow through the bottom inlet at 120 lb./hr. continued during the water addition and afterwards for an additional 17 minutes. Several duplicate runs of this process were conducted. Table I-B lists the data obtained for four representative runs. Moisture levels can be obtained comparable those obtained using the conventional two step process.

TABLE 1-B

| | Predecaffeination Moisture Addition in Column | | | | |
|---|---|---|---|---|---|
| | Column Load (lb.) | Dry Bed Height (inches) | Wet Bed Height (inches) | % Swell | % Bean Moisture |
| (1) | 120 | 89.2 | 138.0 | 54.6 | 50.4 |
| (2) | 120 | 90.0 | 143.2 | 59.2 | 52.9 |
| (3) | 120 | 90.2 | 136.5 | 51.2 | 49.6 |
| (4) | 120 | 89.5 | 139.2 | 55.6 | 45.3 |

EXAMPLE 2

Example 2 illustrates accelerated decaffeination using turbulent solvent flow in a single column system.

Green coffee beans were charged into an extraction column and moisturized using the process of Example 1. Ethyl acetate from the fresh solvent tank was passed through a heat exchanger where it was heated to a temperature of 200° F. Water was added at a controlled rate. The solvent/water mixture was then passed through a heat exchanger and introduced into the solvent recycle line and into the extraction column containing 120 lbs. of green coffee beans. The column is maintained at 50 psig and 202° F. (94° C.). The solvent passed downward through the column, through a heat exchanger, and was partially recycled into the top of the column. Solvent not recycled was pumped to a solvent evaporator for solvent recovery. Fresh solvent was continually introduced into the extractor and spent solvent continuously removed from the column and partially recycled. The fresh solvent feed rate was 581 lb./hr. The solvent to bone dry beans processed ratio was 5.44. These conditions generated a solvent superficial velocity of 7.46 ft./min. The corresponding Reynolds Number was 876, which indicates that turbulent flow was achieved. The coffee beans were extracted in this manner for 210 minutes. The solvent was then removed from the extraction column. Steam was introduced into the column at the bottom at a rate of 130 lb./hr. to remove residual solvent. The steam passed through the column and was removed from the top. The steam stripping was continued for about 6 to 7 hours under a vacuum of about 4.4 psia and the residual solvent level dropped to a maximum of 5 ppm. Thereafter, the decaffeinated coffee beans were discharged from the extraction column and dried. The beans were found by quantitative analysis to be 97.1% caffeine free. This process was repeated under similar conditions. Table II summarizes the operating conditions and shows that 97% decafeination was achieved in about 3½ hours.

TABLE II

| | Accelerated Decaffeination | |
|---|---|---|
| | 9 | 10 |
| Wt. beans (lb.) | 120 | 120 |
| Predecaffeination moisture (%) | 52.9 | 49.6 |
| Column swell H/D | 17.9 | 17.1 |
| Extraction time (min.) | 210 | 210 |
| Column temperature (°F.) (°C.) | 202 (94) | 202 (94) |
| Column pressure (psig) | 50 | 51 |
| Fresh solvent feed rate4(lb./hr.) | 581 | 578 |
| Solvent to bone dry beans processed ratio | 5.44 | 5.41 |
| Solvent recycle ratio | 12.6 | 12.5 |
| Solvent superficial velocity | 7.46 | 7.38 |
| Reynolds Number | 876 | 867 |
| Water inlet (lb./hr.) | 17.6 | 21.5 |
| Caffeine content of dry beans (%) | 0.046 | 0.038 |
| Decaffeination (%) | 97.1 | 97.6 |

EXAMPLE 3

Example 3 shows the effect of variations in several individual operating conditions upon the accelerated decaffeination process. Green coffee beans were moisturized and decaffeinated using the processes described in Examples 1 and 2. Table III lists the operating conditions and results obtained when five parameters were varied individually, i.e., temperature, pressure, solvent to bone dry beans processed ratio, solvent velocity, and extraction time.

TABLE III

| Effect of Operating Parameters on Accelerated Decaffeination | | | | | |
|---|---|---|---|---|---|
| | 11 | 12 | 13 | 14 | 15 |
| Wt. beans (lb.) | 120 | 90 | 1250 | 50 | 120 |
| Extraction time (min.) | 240 | 300 | 240 | 240 | 105 |
| Column temperature (°F.)(°C.) | 160(71) | 201(94) | 200(94) | 201(94) | 202(94) |
| Column pressure (psig) | 50 | 33 | 53 | 60 | 53 |
| Fresh solvent feed rate (lb./hr.) | 572 | 501 | 193 | 202 | 592 |
| Solvent to bone dry beans processed ratio | 5.36 | 6.25 | 1.81 | 4.54 | 5.54 |
| Solvent recycle ratio | 12.9 | 9.0 | 37.7 | 0 | 14.0 |
| Solvent superficial velocity | 6.79 | 4.25 | 6.34 | 0.17 | 7.56 |
| Reynolds Number | 798 | 499 | 745 | 20 | 888 |
| Water inlet (lb./hr.) | 11.0 | — | 5.0 | 3.5 | 11.6 |

TABLE III-continued
Effect of Operating Parameters on Accelerated Decaffeination

| | 11 | 12 | 13 | 14 | 15 |
|---|---|---|---|---|---|
| Caffeine content of dry beans (%) | 0.148 | 0.203 | 0.097 | 0.256 | 0.138 |
| Decaffeination (%) | 90.7 | 87.2 | 93.9 | 83.8 | 91.3 |

The data in column 11 illustrates the adverse effect of using a lower temperature for the extraction process. A decrease in temperature decreases the rate of decaffeination. All operating conditions except temperature are similar to Example 2, yet only 90.7% decaffeination was attained in 4 hours. Generally, in decaffeination processes the majority of caffeine present is removed relatively quickly but much longer times are necessary to remove the final few percent of caffeine present. Thus, small differences in the final percent decaffeination achieved are significant.

The Column 12 data shows the negative effect of using a low pressure. If column pressure is not greater than the sum of the solvent vapor pressure at the operating temperature and the pressure drop across the bean bed, the solvent will boil forming pockets of solvent and water vapor. These pockets slow the decaffeination rate since caffeine removal cannot occur across a solid-to-vapor interface. The lower pressure also adversely affects the recycle ratio and velocity. In this case, only 87.2% decaffeination was achieved in 5 hours.

The data in Column 13 demonstrates that decreasing the solvent to bone dry beans processed ratio decreases the decafeination rate. The ratio was decreased by decreasing the amount of fresh solvent input. This increases the concentration of caffeine in the solvent. A high recycle rate was employed in order to obtain a solvent velocity comparable to Example 2. Only 93.9% decaffeination was achieved in 4 hours.

The Column 14 data shows the effect of eliminating solvent recycle. The solvent velocity is greatly decreased and turbulent flow is not achieved. The rate of decaffeination is thereby decreased. With no solvent recycle, only 83.8% decaffeination was attained in 4 hours, the lowest level represented by all data.

Finally, Column 15 represents operating parameters substantially equivalent to Example 2 except that the extraction time was decreased to 105 minutes. Only 91.3% decaffeination was achieved despite a rate of decaffeination comparable to Example 2. It has been found that a minimum time of at least 180 minutes (3 hours) is needed to obtain 97% decaffeination of the coffee beans.

EXAMPLE 4

Example 4 illustrates countercurrent accelerated decaffeination using turbulent solvent flow through a multi-column extraction system.

One hundred eighty pounds of green coffee beans having a moisture content of 11% by weight were charged into a mechanical mixer. Saturated wet steam was introduced into the mixer at a rate of 90 lbs./hr. for 2 minutes while the coffee beans were mechanically agitated. Water was then introduced at 40 lbs./hr. for 30 minutes while the steam flow continued. The water flow was then stopped and steam injection was continued for 3 minutes. The coffee beans had a final moisture of 32.5%.

Five columns, each 8 inches in diameter with bed heights of about 10 feet, were each loaded with 90 lbs. (dry bean basis) of premoistened coffee beans. Ethyl acetate heated to a temperature of 180° F. (82° C.) was injected into a solvent saturator containing water. The saturated solvent was then passed through a heat exchanger to assure a temperature of about 203° F. (95° C.). The first column of the series was filled via upflow with the heated saturated solvent at a fill rate of 450 lb./hr. Solvent fill time was about 21 minutes. The other columns were added one at a time to the series. The solvent was then cycled countercurrently downward through the columns on a five hour profile. Fresh solvent was introduced at a feed rate of 400 lb./hr. into the column containing the most decaffeinated beans, i.e. that containing beans going into their fifth hour of decaffeination. Solvent from this column was continuously partially discharged in part into the column containing beans going into their fourth hour of decaffeination with the major portion being recycled through the fifth hour column. Solvent from the column containing beans going into their fourth hour of decaffeination was continuously partially discharged into the column containing beans going into their third hour of decaffeination with the major portion being recycled, then second hour with recycle, then first hour with recycle. Spend solvent from the least decaffeinated column of beans was discharged from the decaffeination series. Solvent flow rate out of the system was about 400 lb./hr. A high solvent recycle rate of 8060 lb./hr. was maintained through each column to help assure flow of solvent was turbulent. The recycle pump discharge pressure was 101 psig. The solvent recycle ratio was 19.1. The solvent superficial velocity was 7.56 and the Reynolds number was 891. At steady state operation for the five column series a new column of undecaffeinated beans was added each hour and a column of decaffeinated beans was cut off from the series each hour. The temperature of the decaffeination columns was maintained at 203° F. (95° C.) with a pressure of 65 psig. The solvent to bone dry beans processed ratio was 3.24. Total decaffeination time was 5 hours with 98.7% decaffeination achieved.

As each column of decaffeinated beans was removed from the decaffeination series, it was added to a desolventizing series for removal of residual ethyl acetate. Differential pressure steam stripping with continuous steam flow was used for solvent removal. An initial vacuum of about 1.9 psia was maintained on each column for 10 minutes to decrease the boiling point of the solvent/water mixture and preferentially flash evaporate the solvent. Steam was then injected into each column at a rate of 80 lbs./hr. and pushed the evaporated solvent out of the column. Each column was isolated from the low pressure source by closing a valve causing the pressure to increase and the steam to condense on and within the cooler beans until the bean moisture level was nearly equivalent to its prior level and temperature equilibrium was reached. The valve was opened, the vacuum was then again applied and was cycled on and off at 10 minute intervals. Total desolventizing cycle time was 3½ hours. During the second hour of operation the steam flow was increased to 100 lbs./hr. During the third hour of operation it was 120 lb./hr., and for the final half hour it was 140 lb./hr. A final vacuum of about 2.9 psia was maintained on the column for 10 minutes after the steam flow ceased.

Thereafter, the decaffeinated coffee beans were discharged from the extraction columns and dried using a fluidized bed dryer. A feed rate of 13 lb./min. of coffee beans into the dryer was maintained, and the beans made three passes through the dryer. The air inlet temperature for zone 1 was 280° F. (138° C.) to 330° F. (166° C.). For zone 2 it was 280° F. (138° C.) to 320° F. (160° C.). The air inlet temperature for the cooling zone was 25° F. (−4° C.) to 80° F. (27° C.). Final bean moisture level was 10.7% by weight.

The decaffeinated coffee beans were roasted in a batch Thermolo roaster and ground to drip and regular grind size using a Gump grinder. A coffee brew was prepared in a G.E. Automatic Drip Brewer using 54.0 g. coffee per 1420 ml. of water. The percent brew solids was 0.81.

Using this accelerated process, 98.7% decaffeination of the coffee beans was achieved with only 5 hours of caffeine extraction. This process was repeated under similar conditions. Table IV summarizes the operating conditions for both tests and shows that the accelerated process is effective to achieve decaffeination in a reduced time period.

TABLE IV

Countercurrent Series Accelerated Decaffeination

| | 16 | 17 |
|---|---|---|
| Weight beans (lbs.) | 90 | 90 |
| Predecaffeination moisture (%) | 31.7 | 31.6 |
| Extraction time (min.) | 300 | 300 |
| Column temperature (°F.) (°C.) | 203 (95) | 203 (95) |
| Column pressure (psig) | 65 | 65 |
| Solvent fill rate (lb./hr.) | 450 | 370 |
| Solvent fill time (min.) | 21 | 26 |
| Fresh solvent feed rate (lb./hr.) | 400 | 370 |
| Solvent to bone dry beans processed ratio | 3.24 | 2.62 |
| Solvent discharge rate (lb./hr.) | 400 | 370 |
| Recycle flow rate (lb./hr.) | 8060 | 8060 |
| Recycle pump discharge pressure (psig) | 101 | 101 |
| Solvent recycle ratio | 19.6 | 20.8 |
| Solvent superficial velocity | 7.61 | 7.56 |
| Reynolds number | 894 | 891 |
| Caffeine content of dry beans (%) | 0.019 | 0.044 |
| Decaffeination (%) | 98.7 | 97.0 |
| Brew Solids (%) | 0.81 | 0.82 |

EXAMPLE 5

Example 5 illustrates a comparison of coffee products of the accelerated countercurrent decaffeination process and of traditional decaffeination using ethyl acetate as the extraction solvent.

Coffee was processed as in Example 4 using the countercurrent accelerated decaffeination process. Caffeine extraction was for 5 hours at 200° F. (93° C.). For conventional processing coffee was extracted in a single extraction vessel for 11 hours at 150° F. (66° C.). Solvent removal was atmospheric for 12 hours. The predecaffeination moisture addition, fluidized bed drying, roasting, and grinding, were the same for both processes. Coffee brew prepared from coffee processed by the accelerated decaffeination method had a significantly higher level of brew solids and acid components than the conventionally processed coffee brews. The resultant data is summarized in Table V. The coffee brews were prepared in a G. E. Automatic Drip Brewer using 54.0 g. coffee per 1420 ml. water. The pH was measured using a standard pH meter. The titratable acidity is the milliliters of 0.1N sodium hydroxide that was needed to titrate a sample of 150 ml. of brew to a pH of 7. The brew solids were measured by refractive index at a temperature of 29° C. and correlated with readings from solutions of known brew solids.

TABLE V

Comparison of Decaffeinated Coffee Brews

| | % Brew Solids | pH | Titratable Acidity |
|---|---|---|---|
| Accelerated decaffeination product | | | |
| (1) | 0.82 | 5.09 | 7.6 |
| (2) | 0.80 | 5.08 | 7.6 |
| (3) | 0.78 | 5.12 | 7.4 |
| (4) | 0.80 | 5.15 | 7.3 |
| (5) | 0.82 | 5.10 | 7.6 |
| (6) | 0.87 | 5.06 | 7.7 |
| (7) | 0.83 | 5.05 | 7.7 |
| Average | 0.82 | 5.09 | 7.6 |
| Conventional decaffeination product | | | |
| (1) | 0.64 | 5.22 | 5.3 |
| (2) | 0.65 | 5.23 | 5.2 |
| Average | 0.64 | 5.22 | 5.2 |

What is claimed is:

1. A continuous method for decaffeinating green coffee beans comprising:
    (a) adding steam and water simultaneously to green coffee beans to raise the bean moisture content to about 20% to about 40%.
    (b) extracting caffeine from the green coffee beans in from about 3 to about 5 hours to minimize loss of noncaffeine coffee solubles by countercurrently passing a solvent comprising ethyl acetate saturated with water through the beans in a turbulent flow having a Reynolds Number greater than 250, at a pounds solvent to pounds bone dry beans processed ratio of from about 1.5 to about 6, said beans contained in a series of vessels in order of increasing bean caffeine content;
    (c) removing the residual decaffeination solvent from the beans.

2. The method of claim 1 wherein an additional step comprises drying and cooling the decaffeinated beans.

3. The method of claim 1 wherein the bean moisture content in step (a) is raised to about 25% to about 35%.

4. The method of claim 1 wherein the green coffee beans are simultaneously steamed and wetted, while mechanically agitated or fluidized, for from about 15 to about 45 minutes at atmospheric pressure to provide a bean moisture content of about 30%.

5. The method of claim 1 wherein the ethyl acetate is saturated with water at about 160° F. (71° C.) to about 220° F. (104° C.) and introduced to the beans maintained at a temperature of from about 180° F. (82° C.) to about 220° F. (104° C.) and a pressure of about 45 psig to about 100 psig.

6. The method of claim 1 wherein the turbulent flow of solvent through the beans has a Reynolds Number greater than 500.

7. The method of claim 1 wherein the pounds solvent to pounds bone dry green beans processed ratio is from about 2 to about 5.

8. The method of claim 1 wherein the solvent superficial velocity is from about 2 to about 10 ft./min.

9. The method of claim 1 wherein a portion of the solvent which has passed through the columns is recirculated through each column sufficient to maintain a solvent recycle ratio of about 5 to about 20.

10. The method of claim 1 wherein the vessel height is at least 5 times larger than its diameter.

11. The method of claim 1 wherein the residual solvent is removed from the decaffeinated coffee beans by conventional steam stripping.

12. The method of claim 1 wherein the residual solvent is removed from the decaffeinated coffee beans by countercurrent series steam stripping.

13. The method of claim 1 wherein the residual solvent is removed from the decaffeinated coffee beans using differential pressure steam stripping wherein flash evaporation of the solvent results from cyclic alternating pressure variations.

14. The method of claim 13 wherein the pressure variation is from about 1 to about 5 psia to about 10 to about 20 psia in cycles of about 10 to 20 minutes with intermittent steam flow at rates that vary with the cycle.

15. The method of claim 1 wherein the green coffee beans after solvent extraction are removed from the column by gravity flow, sparging with air or nitrogen, or a combination of these.

16. The method of claim 2 wherein the green coffee beans are roasted after removal of residual solvent.

17. The method of claim 2 wherein the coffee beans are dried by means of a fluidized bed dryer at a temperature of about 270° F. (132° C.) to 400° F. (204° C.) for a time of about 5 to 15 minutes.

18. The method of claim 2 wherein the coffee beans tumble dried under vacuum at about 0 to about 2.5 psi at a temperature of about 150° F. (66° C.) to 160° F. (71° C.) for a time of about 16 hours.

19. The method of claim 2 wherein the coffee beans are conveyor dried by conventional means at a temperature of about 225° F. (107° C.) to about 300° F. (149° C.) for a period of about 15 to about 40 minutes.

20. A method for decaffeinating green coffee beans comprising:
(a) adding steam and water simultaneously to mechanically agitated or fluidized green coffee beans for from about 15 to about 45 minutes at atmospheric pressure to provide a bean moisture content of about 25% to about 35%;
(b) extracting caffeine from the green coffee beans counter-currently in from about 3 to about 5 hours to minimize loss of noncaffeine coffee solubles by passing ethyl acetate saturated with water through the beans at a rate such that the Reynolds Number is greater than 500 and the flow is turbulent, at a pounds solvent to pounds bone dry green beans processed ratio of about 1.5 to about 6, a temperature of about 180° F. (82° C.) to about 220° F. (104° C.) and a pressure of about 45 psig to about 100 psig, said beans contained in a series of columns with heights at least 5 times larger than diameters, in order of increasing bean caffeine content, recirculating through each column a portion of the solvent which has previously passed through the column sufficient to maintain a solvent recycle ratio of from about 5 to about 20, and withdrawing said solvent from the last column of the series;
(c) removing the residual ethyl acetate from the beans by means of differential pressure steam stripping;
(d) drying the decaffeinated beans, and cooling the dried beans to room temperature.

* * * * *

UNITED STATES PATENT AND TRADEMARK OFFICE
CERTIFICATE OF CORRECTION

PATENT NO. : 4,474,821
DATED : October 2, 1984
INVENTOR(S) : Lowen R. Morrison, Jr. and John H. Phillips It is certified that error appears in the above-identified patent and that said Letters Patent are hereby corrected as shown below:

Col. 1, line 28, "Avil" should read -- AVi --.

Col. 2, line 40, after "passing solvent" insert -- comprising a mixture of ethyl acetate and water, -- .

Col. 4, line 7, "annd" should read -- and -- .

Col. 5, line 8, "beam" should read -- bean -- ;

Col. 5, lines 16, 25 and 27, "beams" should read -- beans -- .

Col. 8, lines 47 and 48, delete "comprising a mixture of ethyl acetate and water,".

Col. 14, Table III, Wt. beans (lb.) under "13", "1250" should read -- 120 -- .

Col. 16, line 23, "Spend" should read -- Spent -- .

Col. 19, Claim 18, "psi" should read -- psia -- .

Signed and Sealed this

Seventh Day of May 1985

[SEAL]

Attest:

DONALD J. QUIGG

Attesting Officer   Acting Commissioner of Patents and Trademarks